Patented Apr. 5, 1938

2,113,151

UNITED STATES PATENT OFFICE 2,113,151

MONOAZO-DYESTUFFS

Richard Fleischhauer, Frankfort-on-the-Main-Fechenheim, Germany, assignor to General Aniline Works, Inc., New York, N. Y., a corporation of Delaware No Drawing. Application December 1, 1936, Serial No. 113,611. In Germany December 2, 1935

4 Claims. (Cl. 260—92)

My present invention relates to monoazo dyestuffs, more particularly to those of the general formula

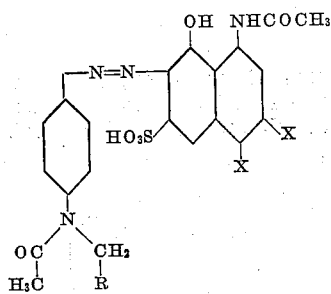

wherein R stands for a member of the group consisting of hydrogen and an alkyl group containing at the most 3 carbon atoms and one X means hydrogen and the other a sulfonic acid group.

The new dyestuffs are obtained by combining diazo compounds of aromatic amines of the formula

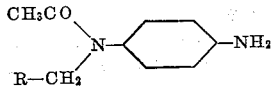

wherein R has the aforesaid signification, with 1-acetylamino-8-naphthol-3,6- or -4,6-disulfonic acid.

The new dyestuffs dye the animal fibres bluish red shades of an unusual fastness to sea-water and are distinguished in comparison with analogous dyestuffs by an excellent levelling power.

In order to further illustrate my invention the following examples are given, the parts being by weight and all temperatures in degress centigrade. However, I wish it to be understood that my invention is not limited to the particular products nor reaction conditions mentioned therein.

Example 1

17.8 parts of 1-(acetyl-ethyl-amino)-4-amino-benzene are diazotized in the usual manner in an aqueous medium. The diazo solution thus obtained is added while cooling to a solution containing an excess of sodium carbonate and 37 parts of 1-acetylamino-8-naphthol-3,6-disulfonic acid. When the formation of the dyestuff has been finished it is isolated and dried. The new dyestuff of the formula

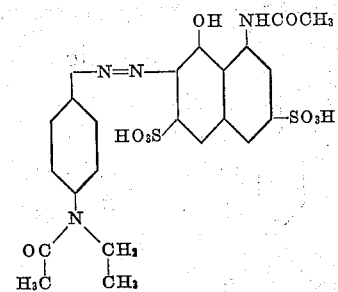

is a dark red water soluble powder and dyes wool bright bluish red shades and exhibits an excellent levelling power.

Example 2

When using as a diazo component the diazo compound of 20.6 parts of 1-(acetyl-isobutylamino)-4-aminobenzene and carrying out the reaction otherwise as described in Example 1 the formed dyestuff of the formula

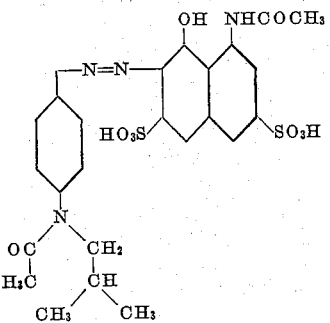

is when dry a bluish red water soluble powder and dyes wool bright bluish red shades and exhibits an excellent levelling power.

Similar dyestuffs are obtained when starting from the diazo compound of 1-[acetyl-n-propyl-(and n-butyl)-amino]-4-amino-benzene.

Example 3

16.4 parts of 1-(acetyl-methyl-amino)-4-amino-benzene are diazotized in the usual manner in an aqueous medium. The diazo solution thus obtained is added while cooling to a solution containing an excess of sodium carbonate and 37 parts of 1-acetyl-amino-8-naphthol-4,6-disulfonic acid. When the formation of the dyestuff has been finished it is isolated and dried. The new dyestuff of the formula

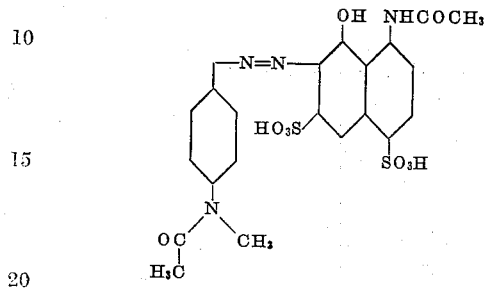

is a red water soluble powder and dyes wool bright red shades and exhibits an excellent levelling power.

Similar dyestuffs are obtained when starting from the other diazo compounds as mentioned in the foregoing examples.

I claim:

1. Monoazo dyestuffs of the general formula

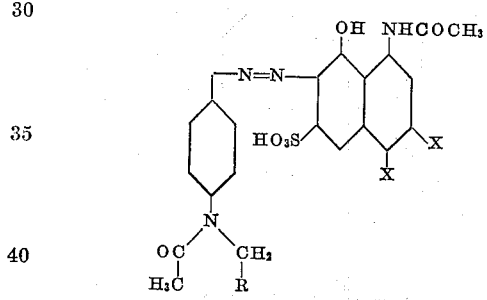

wherein R stands for a member of the group consisting of hydrogen and an alkyl group containing at the most 3 carbon atoms and one X means hydrogen and the other a sulfonic acid group, which dyestuffs dye the animal fibres bluish red shades of an unusual fastness to sea-water and are distinguished in comparison with analogous dyestuffs by an excellent levelling power.

2. The monoazo dyestuff of the formula

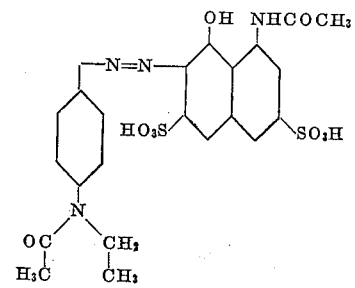

which dyestuff is a dark red water soluble powder and dyes wool bright bluish red shades and exhibits an excellent levelling power.

3. The monoazo dyestuff of the formula

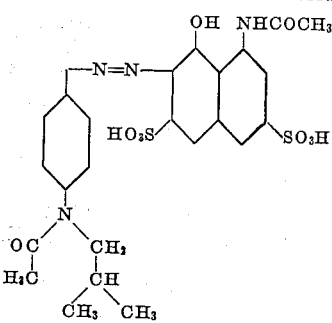

which dyestuff is when dry a bluish red water soluble powder and dyes wool bright bluish red shades and exhibits an excellent levelling power.

4. The monoazo dyestuff of the formula

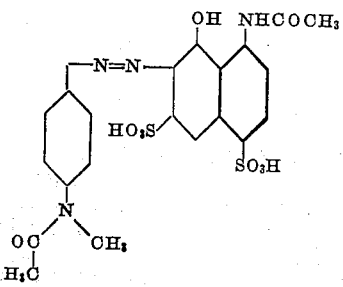

which dyestuff is when dry a red water soluble powder and dyes wool bright red shades and exhibits an excellent levelling power.

RICHARD FLEISCHHAUER.